US011494068B2

(12) United States Patent
Speare et al.

(10) Patent No.: US 11,494,068 B2
(45) **Date of Patent: *Nov. 8, 2022**

(54) GRAPHICAL USER INTERFACES FOR OPTIMIZATIONS

(71) Applicant: Palantir Technologies Inc., Denver, CO (US)

(72) Inventors: Robert Speare, New York, NY (US); Dayang Shi, New York, NY (US); Spencer Lake, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/104,553

(22) Filed: Nov. 25, 2020

(65) Prior Publication Data

US 2021/0081101 A1 Mar. 18, 2021

Related U.S. Application Data

(63) Continuation of application No. 16/144,942, filed on Sep. 27, 2018, now Pat. No. 10,877,654.

(60) Provisional application No. 62/652,223, filed on Apr. 3, 2018.

(51) Int. Cl.

| | |
|---|---|
| ***G06F 3/04847*** | (2022.01) |
| ***G06F 3/0482*** | (2013.01) |
| ***G06F 9/451*** | (2018.01) |
| ***G06F 16/26*** | (2019.01) |
| *G06N 20/00* | (2019.01) |

(52) U.S. Cl.
CPC ........ *G06F 3/04847* (2013.01); *G06F 3/0482* (2013.01); *G06F 9/451* (2018.02); *G06F 16/26* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,249,033 | B1 * | 7/2007 | Close | G06Q 30/0206 705/400 |
| 10,877,654 | B1 * | 12/2020 | Speare | G06F 9/451 |
| 2002/0099581 | A1 * | 7/2002 | Chu | G06Q 30/02 707/600 |
| 2012/0254092 | A1 * | 10/2012 | Malov | G06Q 30/0201 706/52 |
| 2014/0122486 | A1 * | 5/2014 | Simard | G06N 20/00 707/737 |
| 2014/0218383 | A1 | 8/2014 | Srivastava | |
| 2015/0186352 | A1 * | 7/2015 | Greenwood | G06F 40/14 715/217 |
| 2017/0147681 | A1 * | 5/2017 | Tankersley | G06F 11/3048 |
| 2018/0046926 | A1 * | 2/2018 | Achin | G06N 20/20 |

* cited by examiner

*Primary Examiner* — Roberto Borja
(74) *Attorney, Agent, or Firm* — Knobbe Martens Olson & Bear LLP

(57) ABSTRACT

User interfaces are provided for improved data optimization. A model user interface can be used to generate models based on a historical data file based on modeling details and filters specified by a user. The user can save the models and apply the models to optimize a data file. The user can specify optimization details and see visualizations of the results.

19 Claims, 10 Drawing Sheets

| | A | B | C | D | E | F | G | H | I | J |
|---|---|---|---|---|---|---|---|---|---|---|
| 1 | Entity # | Historical Date 1 | | Historical Date 2 | | Historical Date 3 | | Optional Date (s) | Optional Date (s) | Optional Date (s) |
| 2 | | Parameter P1 | Contribution | Parameter P1 | Contribution | Parameter P1 | Contribution | Parameter P2 | Parameter P3 | Parameter P4 |
| 3 | | Number | to result | Number | to result | Number | to result | Size Type | Number | Boolean |
| 4 | Entity 1 | 1 | 100% | 1 | 100% | 1 | 100% | Small | 3 | TRUE |
| 5 | Entity 2 | 2 | 100% | 2 | 100% | 2 | 100% | Medium | 1 | FALSE |
| 6 | Entity 3 | 3 | 100% | 3 | 100% | 3 | 100% | Large | 4 | TRUE |
| 7 | Entity 4 | 4 | 100% | 4 | 100% | 4 | 100% | Small | 1 | FALSE |
| 8 | Entity 5 | 5 | 100% | 5 | 100% | 5 | 100% | Medium | 5 | TRUE |
| 9 | Entity 6 | 6 | 0% | 1 | 50% | 1 | 50% | Large | 9 | FALSE |
| 10 | Entity 7 | 7 | 0% | 2 | 50% | 2 | 50% | Small | 2 | TRUE |
| 11 | Entity 8 | 8 | 0% | 3 | 50% | 3 | 50% | Medium | 6 | FALSE |
| 12 | Entity 9 | 9 | 0% | 4 | 50% | 4 | 50% | Large | 5 | TRUE |
| 13 | Entity 10 | 0 | 0% | 5 | 50% | 5 | 50% | Small | 3 | FALSE |
| 14 | Entity 11 | 1 | 100% | 1 | 100% | 1 | 100% | Medium | 5 | TRUE |
| 15 | Entity 12 | 2 | 100% | 2 | 100% | 2 | 100% | Large | 8 | FALSE |
| 16 | Entity 13 | 3 | 100% | 3 | 100% | 3 | 100% | Small | 9 | TRUE |
| 17 | Entity 14 | 4 | 100% | 4 | 100% | 4 | 100% | Medium | 7 | FALSE |
| 18 | Entity 15 | 5 | 100% | 5 | 100% | 5 | 100% | Large | 9 | TRUE |
| 19 | Entity 16 | 6 | 50% | 6 | 50% | 8 | 50% | Small | 3 | FALSE |
| 20 | Entity 17 | 7 | 50% | 7 | 50% | 8 | 50% | Medium | 2 | TRUE |
| 21 | Entity 18 | 8 | 50% | 8 | 50% | 8 | 50% | Large | 3 | FALSE |
| 22 | Entity 19 | 9 | 0% | 9 | 0% | 8 | 50% | Small | 4 | TRUE |
| 23 | Entity 20 | 0 | 0% | 0 | 0% | 8 | 50% | Medium | 6 | FALSE |
| 24 | Result (sum): | 40.5 | | 48 | | 57.5 | | | | |
| 25 | Target: | 45+ | | 45+ | | 50+ | | | | |

Historical Data / Spreadsheet

FIG. 1

| | A | B | C | D | E | F |
|---|---|---|---|---|---|---|
| 1 | Entity # | Parameter P1 | Contribution | Parameter P2 | Parameter P3 | Parameter P4 |
| 2 | | Number | (guess) | Size Type | Number | Boolean |
| 3 | Entity 1 | 5 | 100% | Small | 3 | TRUE |
| 4 | Entity 2 | 5 | 100% | Medium | 1 | FALSE |
| 5 | Entity 3 | 5 | 100% | Large | 4 | TRUE |
| 6 | Entity 4 | 5 | 100% | Small | 1 | FALSE |
| 7 | Entity 5 | 5 | 100% | Medium | 5 | TRUE |
| 8 | Entity 6 | 8 | 50% | Large | 9 | FALSE |
| 9 | Entity 7 | 8 | 50% | Small | 2 | TRUE |
| 10 | Entity 8 | 8 | 50% | Medium | 6 | FALSE |
| 11 | Entity 9 | 8 | 50% | Large | 5 | TRUE |
| 12 | Entity 10 | 8 | 50% | Small | 3 | FALSE |
| 13 | Entity 11 | 5 | 100% | Medium | 5 | TRUE |
| 14 | Entity 12 | 5 | 100% | Large | 8 | FALSE |
| 15 | Entity 13 | 5 | 100% | Small | 9 | TRUE |
| 16 | Entity 14 | 5 | 100% | Medium | 7 | FALSE |
| 17 | Entity 15 | 5 | 100% | Large | 9 | TRUE |
| 18 | Entity 16 | 8 | 50% | Small | 3 | FALSE |
| 19 | Entity 17 | 8 | 50% | Medium | 2 | TRUE |
| 20 | Entity 18 | 8 | 50% | Large | 3 | FALSE |
| 21 | Entity 19 | 8 | 50% | Small | 4 | TRUE |
| 22 | Entity 20 | 8 | 50% | Medium | 6 | FALSE |
| 23 | Result (sum): | 65 | | | | |
| 24 | Target: | 55+ | | | | |

Historical Data / Spreadsheet

GRAPHICAL USER INTERFACES FOR OPTIMIZATIONS

RELATED APPLICATIONS

This application is a continuation of U.S. patent application Ser. No. 16/144,942, filed Sep. 27, 2018, entitled "GRAPHICAL USER INTERFACES FOR OPTIMIZATIONS," which application claims the priority benefit of U.S. Provisional Patent Application No. 62/652,223, filed Apr. 3, 2018, entitled "GRAPHICAL USER INTERFACES FOR OPTIMIZATIONS." The entire disclosure of each of the above-referenced application is hereby made part of this specification is if set forth fully herein and incorporated by reference for all purposes, for all that it contains.

Any and all applications for which a foreign or domestic priority claim is identified in the Application Data Sheet as filed with the present application are hereby incorporated by reference under 35 U.S.C. § 1.57 for all purposes and for all that they contain.

TECHNICAL FIELD

This disclosure relates to user interfaces for data optimization.

BACKGROUND

A background is provided for introductory purposes and to aid the reader in understanding the detailed description. The background should not be taken as an admission of any prior art to the claims.

Users may interact with computers to process data. However, the designs of currently available user interfaces limit the speed and efficiencies of such interactions. For example, some user interfaces may show large amounts of data in formats that can be difficult for people to understand or comprehend. As another example, some user interfaces may require many user interactions and/or many user inputs to perform operations. As a result, users may work slowly when using such user interfaces to process data.

It has been noted that design of computer user interfaces "that are useable and easily learned by humans is a non-trivial problem for software developers." Dillon, A. (2003) User Interface Design. MacMillan Encyclopedia of Cognitive Science, Vol. 4, London: MacMillan, 453-458.

SUMMARY

Some aspects feature a computer system with an improved user interface, the computer system comprising: one or more computer readable storage devices configured to store a plurality of computer readable instructions, a memory, a communications interface configured for transmitting data to a display device, and one or more processors. The one or more processors are configured to execute the plurality of computer readable instructions to cause the computer system to perform operations including transmitting display data to through the communications interface to the display device for displaying an optimization interface. The optimization interface includes a first input element for receiving an identification of a data file comprising: one or more identifiers of entities and a target parameter associated with each of the entities. The optimization interface also includes: a second input element for receiving an optimization target value, a third input element for receiving one or more optimization constraints, and a fourth input element for receiving an identifier of a contribution model for determining, based at least in part on the target parameter associated with each of the entities, a modeled contribution value for each of the entities. The operations further include: transmitting, through a network to a remote computer, the one or more identifiers of the entities, the identifier of the target parameter, the optimization target value, the one or more optimization constraints, and the identifier of the contribution model for the remote computer to optimize the target parameters to achieve the optimization target value; and transmitting display update data through the communications interface to the display device for displaying a first graphical visualization of a distribution of optimized target parameters associated with each of the entities.

The computer system can feature one, all, or any combination of the following features. The optimizing comprises: changing at least some of the target parameters associated the entities, wherein the target parameters are changed to be within the one or more optimization constraints; determining an entity contribution value for each of the entities using the contribution model; and determining contributions of the target parameters associated with each of the entities toward the optimization target value based at least in part on the entity contribution values for each of the entities. The remote computer is configured to: cache values for the target parameter associated with each of the entities; and optimize the cached values for the target parameters within the one or more optimization constraints to achieve the optimization target value. The remote computer is configured to translate the constraints into an optimization problem and cache data associated with the optimization problem to speed up iterations of an optimization algorithm. The operations further include transmitting display data to through the communications interface to the display device for displaying a modeling interface comprising: a fifth input element for receiving indication of a historical data file, an option to generate a model file based the historical data file, and a sixth input element to specify where to save the model file. The modeling interface further comprises: a seventh input element for specifying a type for the model and a display area configured to show coefficients determined for the model, wherein the coefficients are determined based at least on the specified type for the model. The modeling interface further comprises: a eighth input element for specifying one or more grouping parameters and a display area configured to show different groups of entities, wherein a combination of values of the one or more grouping parameters is shown for each group. The modeling interface further comprises: a visualization showing, for different groups of entities, a modeled relationship between the modeled contribution value and a change in a target parameter. The optimization interface further comprises: a ninth input element for receiving an identifier of a backup model configured to be used when an entity does not satisfy grouping criteria identified in the contribution model. The optimization interface further comprises: a tenth input element for receiving an selection of an optimization step; and a visualization showing a result achieved during the optimization step. The optimization interface further comprises: a visualization showing a distribution of optimized values for the target parameter associated with each of the entities. The visualization is a frontier plot. The optimization interface further comprises: a display area showing statistics about optimized values for the target parameter associated with each of the entities. The optimization interface further comprises: an eleventh input element for receiving identifications of places in the data file that grouping parameters are located. The optimization interface is configured to dynamically change to prompt the user to identify where each grouping parameter specified in the contribution model is located in the data file whenever a new contribution model is identified. The optimization interface further comprises: an twelfth input element for a file path for saving optimized values for the target parameter.

In various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 1 shows an example spreadsheet user interface showing historical data for entities.

FIG. 2 shows an example spreadsheet user interface for modeling effects of changes to a parameter on a result.

DETAILED DESCRIPTION

Overview

Figure 3:
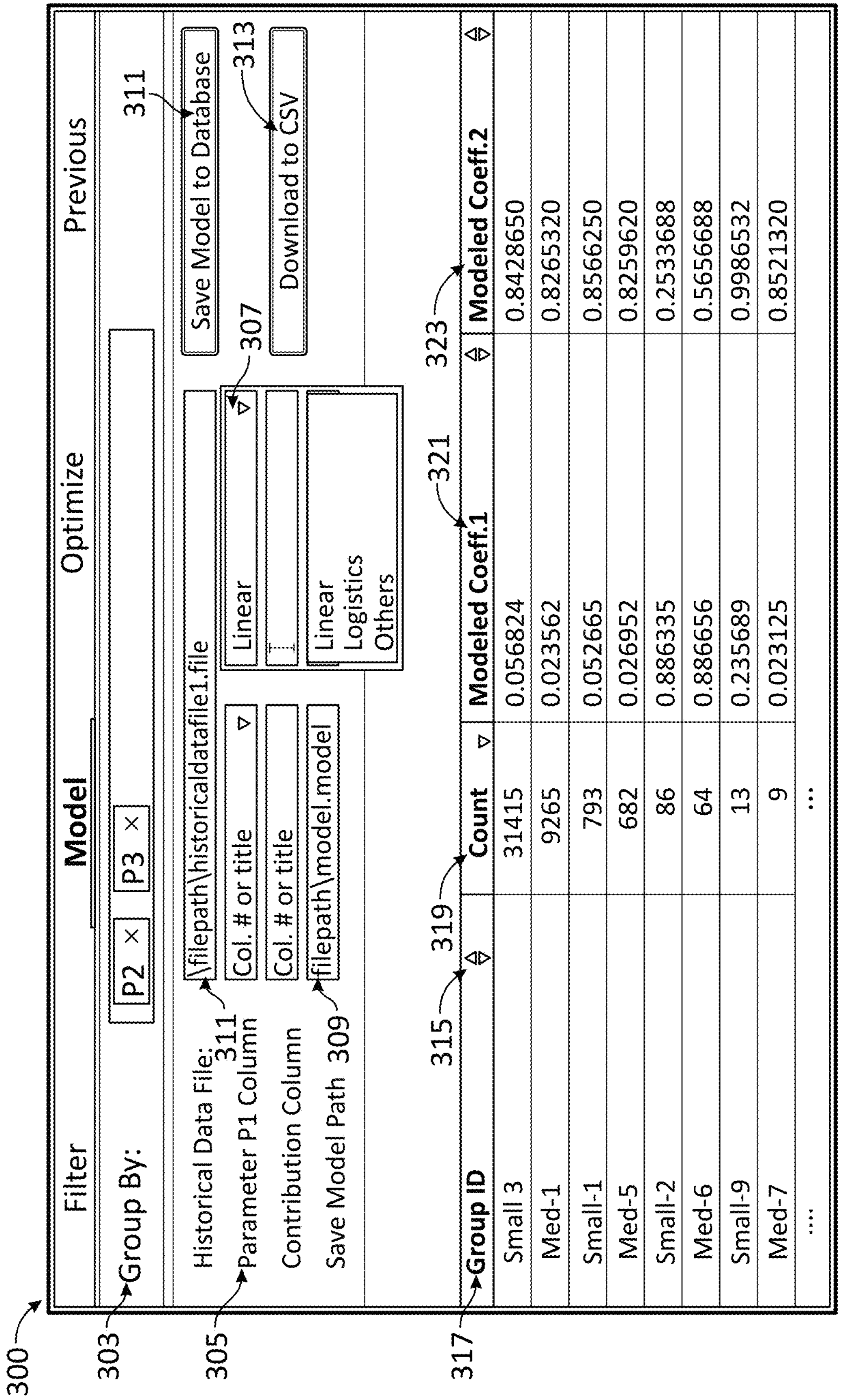
FIG. 3 shows an example user interface (UI) for generating a model based on historical data.

Improved interactive graphical user interfaces, such as shown in FIG. 3, FIG. 4, FIG. 5, FIG. 6, FIG. 7, and FIG. 8 can allow for easy manipulation, modeling, or optimization of large amounts of data. Using the improved graphical user interfaces, users can more quickly and more intuitively perform tasks in minutes that would have taken hours, days, or weeks (or longer) without using the improved graphical user interfaces. With the improved graphical user interfaces, users can also gain more insight about historical data and optimized results, even when large quantities of data are involved.

Some benefits are derived from the arrangement of options and prompting of options. Some benefits are derived from being able to independently change options. Some benefits are derived from presenting user interface elements together in one or different user interfaces. Some benefits are derived from presenting elements through fewer menus, and users can provide inputs with fewer interactions.

Spreadsheet Interfaces

FIG. 1 shows an example spreadsheet interface 100 showing historical data for entities. The spreadsheet interface 100 shows historical data including a plurality of entities (e.g., entity 1-entity 20) and a plurality of parameters (e.g., parameter P1-parameter P4) associated with each of the entities. Some parameters (e.g., parameter P1) are associated with dates (e.g., historical date 1-historical date 3). Some parameters (e.g., parameter P2-Parameter P4) can be associated with a date or can be time invariant. The spreadsheet interface also shows contribution amounts associated with the P1 parameter values toward a result, as well as a target result for each historical date.

The various parameters (e.g., P1-P4) can represent various properties associated with each entity. The values for the various parameters can be numerical values, Boolean values, date values, categories (such as big entity, medium entity, small entity), strings, characters, or any other type of data value.

Although the spreadsheet interface 100 shows a limited number of dates, entities, contributions, and parameters, it will be understood that the number of dates, entities, contributions, and/or parameters can extend to greater numbers. Complex spreadsheets can include hundreds, thousands, millions, or billions of dates, entities, and/or parameters or more.

For any historical date, a result (such as a total sum, an average, a Boolean truth, or a result according to any other expression) can be determined based at least in part on values of at least a first parameter (such as parameter P1) and also based on a contribution. In the example spreadsheet interface 100, the illustrated example result is a sum. For each historical date, each value for the first parameter P1 contributes toward the result (e.g., is added to the total sum) by a certain amount indicated in the column "Contribution to result." While some parameter P1 values have 100% of their value contributed toward the total result, other parameter P1 values may have 50% or 0% (or other percentage) of their values contributed toward the total sum. Accordingly, the contribution can act as a multiplier for a value of a parameter P1 when determining how much the parameter P1 contributes towards the result.

In some other embodiments, the contribution values can be Boolean values, where true or "1" contribution indicates that the value for a parameter P1 is included in determining the result, and a false or "0" contribution value indicates that the value for a parameter P1 is excluded from affecting the result. The contribution values can include any range of numbers. Contribution values will be understood to include indications of negative contributions and/or indications of entities that do not contribute to the result.

A "target" value is shown for each historical date. It can be desirable to have a result that satisfies the target value. The target value can be one value or range of values, and the target can change over time. For example, the target value for the Historical Date 1 is 45 or greater, but the result of 40.5 did not satisfy the target value. The target value for Historical Date 2 is 45 or greater, and the result of 48 satisfied the target value.

The spreadsheet interface 100 shows the values for the parameters P1-P4 for historical dates. One or more parameters can be changed over time. One or more other parameters may be constant over time. Spreadsheets, such as shown in FIG. 1, can be used to track real-world events. For example, the entities can be different power lines, and P1 can represent power delivered through the power lines, and the target value can be a range of power that a power plant can generate. As another example, the entities can be different people, parameters P2-P4 can be demographic information about the people, and parameter P1 can be a number of attempted interactions with each person, and the result can be a number of successful interactions. As another example, the entities can be different companies, the parameters P2-P4 can represent properties of the companies, and parameter P1 can indicate periodically contracted consideration, and the result can be a total consideration over each period. As another example, the entities can be products, the parameter P1 can be an inventory number for each product, the contribution can be a value of each unit of the product, parameters P2-P4 can be properties of the product, and the result can be a total inventory value. Spreadsheets are used for a broad range of data that is not limited to the examples listed herein. In various embodiments, the other parameters, such as parameters P2-P4, can also indicate statistics about the parameter P1 or the contribution (such as how the parameter P1 or how the contribution changes over time).

There can be various correlations between the contribution of the P1 values of each entity to the result, the parameter P1 values for each entity, and/or the values of other parameters for each entity. The correlations may be strong or weak. Users can use the spreadsheet interface 100 to review historical data and attempt to guess at the correlations. Then, the users can use the guessed correlations to adjust one or more parameter value (such as the values of parameter P1 and the values of the contribution) for different entities to achieve the target values.

For example, looking at the data from Historical Date 1, it can be seen that the parameter P1 values of 7-10 for entities 6-10, respectively, are not contributing toward the result. However, other entities 1-5 and 11-15 with parameter P1 values in the range of 1-5 have 100% of their parameter P1 values contributing to the result. Based on this information, a user can guess that changing the P1 values for entities 6-10 to values of 1-5, respectively, may increase the result. The data gathered on Historical Date 2 shows that this change does increase the result by having 50% of the parameter P1 values of entities 6-10 contribute to the result.

It can be desirable to "optimize" values for the parameter P1 that are associated with each entity to achieve different results. A parameter (such as parameter P1) is considered "optimized" if a target value that depends on that parameter is achieved. For example, a parameter relating to one individual can be considered optimized if a target value of an overall population that includes the individual is achieved. As used herein, the term "optimized" does not necessarily imply any degree of efficiency, maximization, or minimization. Accordingly, "optimizing" a parameter is used to describe changing values for the parameter to achieve the target value that depends on the parameter.

The spreadsheet may show hundreds, thousands, or millions of data entries, or more. It can be difficult for a user to see, grasp, and understand the importance of the data entries and correlations between the data entries due to the sheer quantity of data. Accordingly, it can be difficult for users to make guesses informed by the entirety of the data.

Users are limited in their ability to comprehensively analyze the data and to determine correlations. It can become increasingly difficult for users to see the effects of increasing larger numbers of parameters on the contribution of parameter P1 values to the result. However, users may desire to change values for the parameter P1 for different entities to achieve a different target value. Some users may be tasked with doing so at various times or intervals, such as daily, weekly, monthly, or quarterly. Due to large quantities of data and limited time constraints, users may be unable to calculate multiple correlations between different parameters and unable to use the multiple correlations to determine how the parameter P1 values should be changed. When faced with large amounts of data (such as hundreds, thousands, millions, or billions of entities, parameters, dates, and/or parameter values) and limited time (such as hours, days, weeks, or months), users resort to guesses and gut instincts about the relationships between entities, parameters, parameter values, and the result.

FIG. 2 shows an example spreadsheet interface 200 for modeling effects of changes to a parameter on a result. The example spreadsheet interface 200 shows a list of the entities, the first parameter P1 associated with each of the entities, an estimated or guessed contribution of each value of the first parameter to a result, a target value, and other parameters (such as P2-P4) associated with each of the entities.

A user can change the values for each parameter P1, and the result can be configured to update to reflect the changes to the values of the parameter P1. The user can also change the estimated or guessed contribution of each value for the parameter P1 to the result, and the result can also be configured to update to reflect the changes to the contribution.

In some embodiments, the contribution values can be determined according to an expression that is a function of the value of the P1 parameter and one or more other parameters, such as parameter P2, in view of the historical data. For example, if parameter P2 indicates that Entity 1 is a small entity, then the expression for the contribution can be based on the correlation between values of parameter P1 and the contribution associated with small entities as indicated in the historical data. It can take time to analyze the historical data to determine the correlation and code the expression. Furthermore, once codified as an expression, a user may desire to change the expression to operate under a new set of assumptions (such as a correlations between the parameter P1, the contribution and parameter P3 instead of parameter P2). It can take time to analyze the historical data, determine the new correlations between parameter P1, the contribution, and parameter P3, and code the new correlations as an expression. Furthermore, a user may desire to look at a different set of historical data. It can take time to analyze the new historical data, determine the new correlations between the parameter P1 and the historical data, and code the new correlations as an expression.

In addition to manually writing new expressions for correlations and/or intuitively guessing at contributions, a user may manually edit the values for the parameter P1. Users may change the values for P1 based on user intuition and limited understanding of the historical data in order to try to achieve the target. Such a guess and check technique can take time. All of these time-consuming steps may limit an ability or speed at which the parameter P1 can be adjusted and may yield less desirable results.

Modeling Interfaces

FIG. 3 shows an example user interface (UI) 300 for generating a model based on historical data. A user can enter a file path for identifying a historical data file 301 (such as shown in FIG. 1) to use for generating a model. The historical data file can include data collected about past parameter P1 values for one or more entities, how those past parameter P1 values contributed toward a result, and other parameters of the one or more entities.

Figure 4:
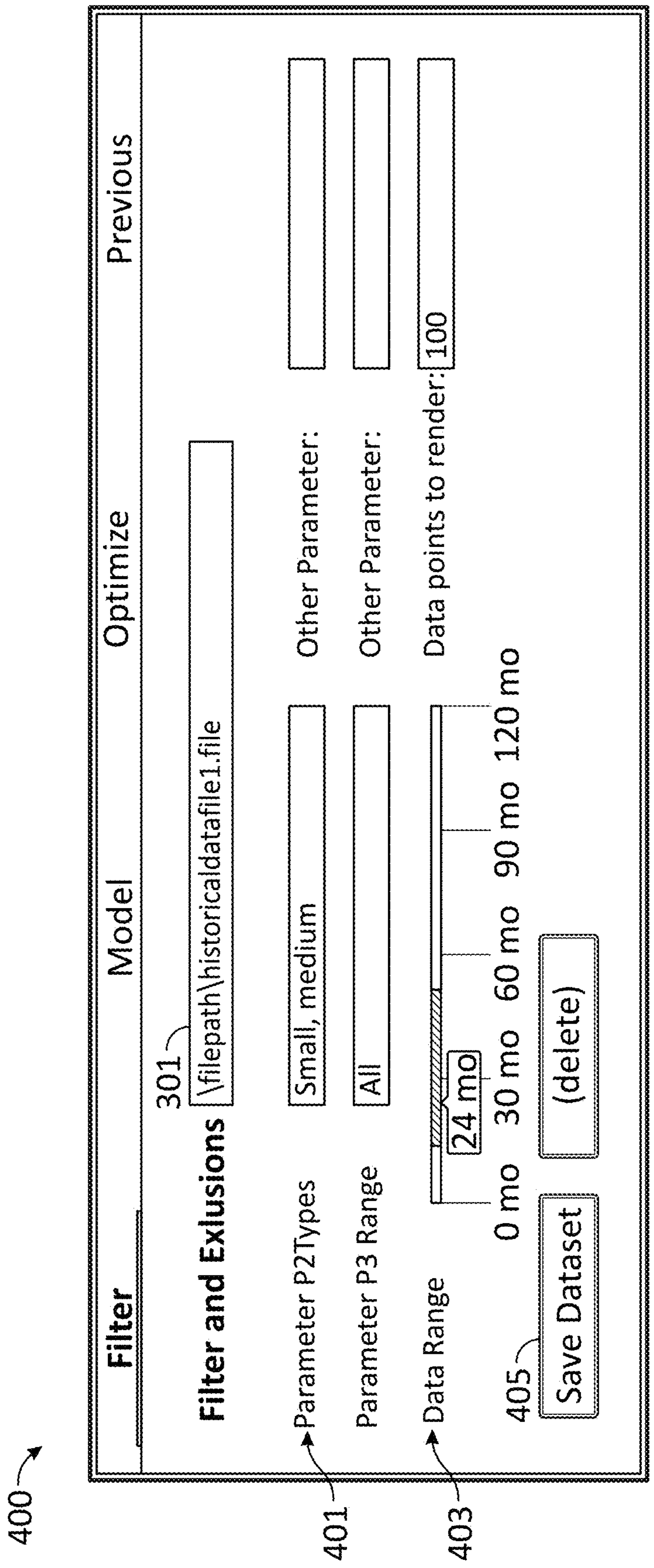
FIG. 4 shows an example UI for filtering data from a historical data file.

FIG. 4 shows an example UI 400 for filtering data from a historical data file. The second UI 400 provides options 401 for selecting different parameters from the historical data file. A user can specify which values for the parameters to include for modeling and/or which values for the parameters to exclude from modeling. If the example UI 400 were applied to the historical data shown in FIG. 1, then the user will have selected to include entities where the parameter P2 size is small and medium but exclude entities that are a large size. The options 401 can also allow the user to select subsets of entities to include or exclude. The second UI 400 also provides a time filter 403 that can allow a user to specify a date range or time range to include or exclude from modeling.

When a user selects the "Save Dataset" button 405, the filters can also be applied to the underlying historical data and saved as a new historical data file. The filters provided in the UI 400 can be also be applied when generating a model through the UI 300 of FIG. 3. In some embodiments, any combination of the elements and functionality of the UI 300 and UI 400 can be combined into a single UI.

Figure 5:
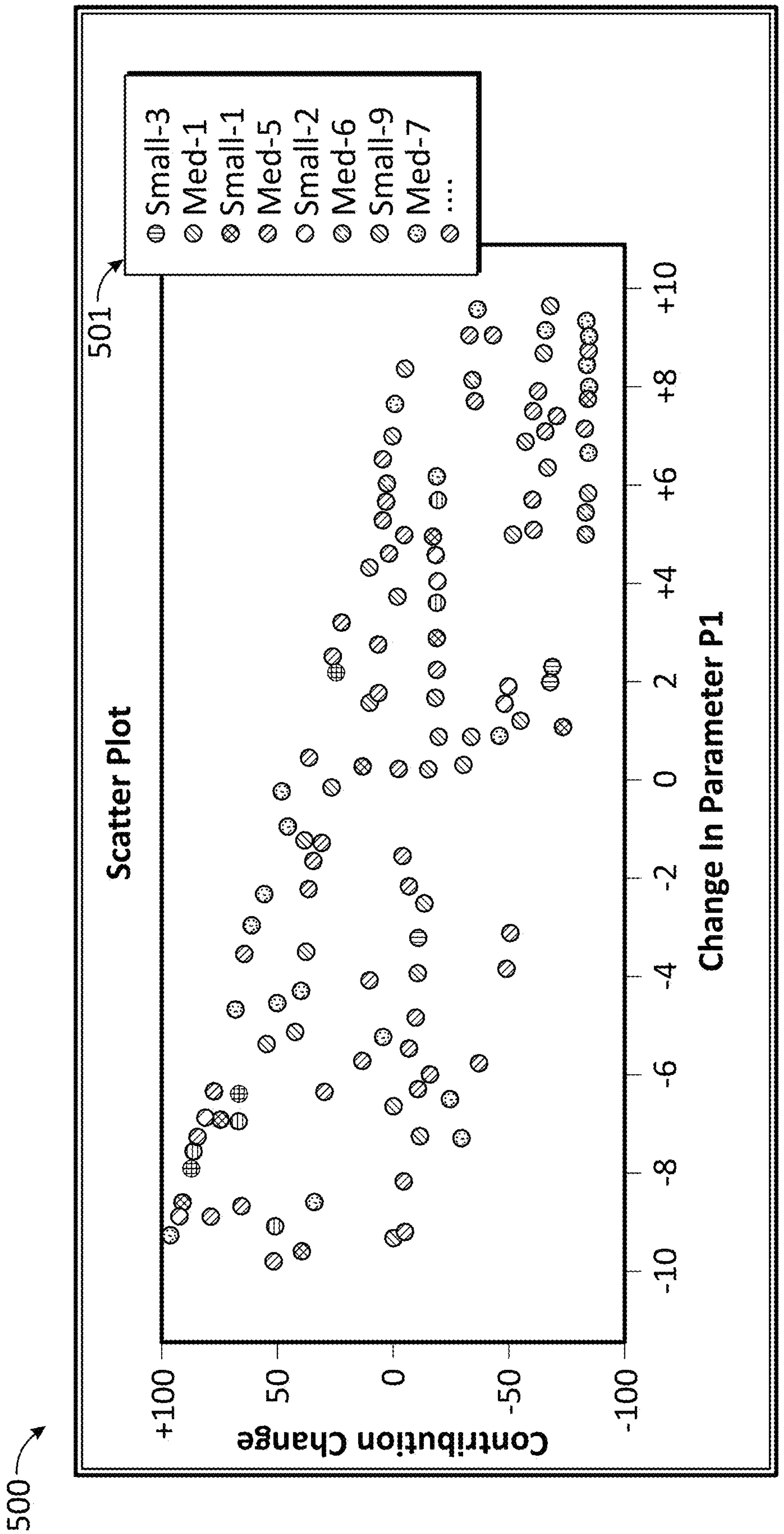
FIG. 5 shows an example visualization of model results.

The UI 300 of FIG. 3 also provides grouping options 303, a parameter identifier input field 305, a menu 307 for selecting a modeling type, a file path option 309 for saving the generated model, a button 311 for saving the model to the file path, a button 313 for exporting the model to another format such as comma separated values, and a results area 315. The results area 315 can include a listing 317 of different groups, a count 319 of data points within each group, a list of values 321 for a first model coefficient for each group, and a list of values 323 for other model coefficients for each group. In some embodiments, the results area 315 can also include one or more visualizations, such as shown in FIG. 5.

The grouping options 303 allow a user to select which parameters may be used to group entities for purposes of determining relationships between parameter P1 values and the contribution rates. The user can select any combination of parameters to use as a basis for grouping or categorizing entities. For example, with respect to FIGS. 1 and 3, if a user suspects that there is a correlation (or other effect or relationship) between parameter P2 size and how the values of parameter P1 contribute to the result, then the user can enter the parameter P2 size as a grouping option 303. The grouping options 303 can be identified, for example, by column, by row, by text from a heading of a column or row, by a range of data values, etc. Users can use the grouping option to generate specific models for entities with certain types of characteristics.

As shown in the example UI 300 of FIG. 3, the grouping options indicate parameters P2 and P3. In the example shown in FIG. 1 where the parameter P2 is a size and the parameter P3 is a number, the listing 317 can list the resulting group combinations based on the user provided grouping options. The listing 317 (and modeling) can include and exclude entities based on the filtering options provided in the UI 400 of FIG. 4 (such as excluding entities where parameter P2 is large).

The parameter identifier input field 305 can be used to identify where the parameter to be optimized (e.g., the parameters P1 values) are found in identified historical data file 301. Historical data files can be formatted differently, have parameters arranged in different orders, and/or label parameters by different names. Accordingly, a user can identify to the system which data values are the parameter P1 values. The user can provide, for example, a row number, a column number, heading text from the row or column, a range of data values, etc. The parameter identifier input field 305 can also be used to identify where the contribution rates are found in the identified historical data file 301.

The user can select a type of model 307 to be generated. For example, the user can select a linear model, a logistic model, or other type of model. The system can be configured to generate the selected type of model 307 to model a relationship between the parameter P1 values and the contributions for each group of entities based on the data in the identified historical data file 301 (which can be filtered as shown in FIG. 4). The model can, for each group of entities specified by the grouping options 303, determine a value for the contribution as a function of at least the parameter P1 value. The function can be a linear, logistic, or other function selected by the user. The function can be a best-fit function based on historical values of pairs of parameter P1 and contributions. The model can be saved and subsequently used for optimizing parameter P1 values (such as described with respect to FIG. 6).

An example is provided in this paragraph with respect to FIG. 3, FIG. 4, and FIG. 1, wherein a user has indicated that the spreadsheet of FIG. 1 is the identified historical data file 301. For the example in this paragraph, it will be understood that the spreadsheet of FIG. 1 shows only a limited subset of a much larger data set (e.g., there can be more entities than shown). If a linear model is selected, then one or more processors can be configured to analyze the historical data file 301 to determine which entities are associated with parameter P2 values of small or medium (as specified by the filter criteria provided by a user through the UI 400). The one or more processors can then identify a first grouping according to the grouping criteria 303. As shown in the spreadsheet of FIG. 1, the first entity has a parameter P2 value of “Small” and a parameter P3 value of “3.” Accordingly, Small-3 can be a first grouping displayed in the listing 317. The one or more processors can then be configured to determine all entities having the same parameter P2 and parameter P3 values. As shown by the count 319, the spreadsheet of FIG. 1 can include 31415 entities (not shown in FIG. 1) within the Small-3 group. The one or more processors can then determine a linear model, such as a best-fit line or a line that satisfies an error threshold, to model the relationships between the contribution value and the parameter P1 values for entities within the Small-3 group. A linear model can be according to the equation $Y=mX+b$, where Y is a value for the contribution, X is the value for parameter P1, m is a slope coefficient indicating a relative change in contribution per change in parameter P1, and b is an offset coefficient. The coefficients m and b can be displayed in the results area 315 under the list of first model coefficients 321 and under the list of other model coefficients 323. Then, the one or more processors can be configured to repeat the modeling for the other entity groups in the historical data file. The number of displayed coefficients can change based on the type of model selected.

After the model is determined, the user can select a button 311 to save the model to a database or in another directory. The user can also export the results of the model to another format, such as comma separated values, by selecting another button 313.

FIG. 5 shows an example visualization 500 of model results. The visualization can show different types of data associated with the model results. The example visualization 500 shows a scatterplot with an x-axis indicating a change in a value for parameter P1 and the y-axis indicating a change in the contribution. A legend lists the different categories determined in accordance with the user-selected grouping options 303 from FIG. 3 and filter options from FIG. 4. Data for different groups can be hidden or displayed in the visualization 500 by toggling the group in the legend.

The example visualization 500 shows that generally and across a broad range of groups, as P1 increases, the contribution of the value of P1 towards a result tends to decrease. Some groups of entities follow this relationship more closely than others. By looking at the graph, users can see how certain groups of entities have their contributions increased or decreased as their parameter P1 values change. The number of data points shown in the visualization 500 can be limited by the number of data point to render provided by the user through the UI 400.

In various embodiments, the x-axis and/or the y-axis can be shown as a % change instead of a quantity change. In various embodiments, the visualization 500 can show values for the parameter P1 and contribution instead of changes in values. In various embodiments, the visualization can also include the modeled trend lines (such as according to the equation $Y=mX+b$). In various embodiments, the visualization can be a bar graph, line graph, pie chart, or any other type of visualization of aggregate data.

With the UI's 300, 400, and 500, a user can generate a plurality of models and save the models as different files. A user can observe relationships between the parameter P1 and the contribution when entities are grouped under various criteria. Any outliers that a user identifies by observing the visualization 500 can be further modeled, or modeled with more in-depth grouping. The user can change the historical data to a different set of historical data and observe how that change affects a modeled relationship between the parameter P1 and the contribution for various entity groups. These changes, re-modeling, and analysis can be performed much faster and with far fewer user inputs (such as clicks, typing, etc.) and less user work overall as compared to using other interfaces.

Optimization User Interfaces

Figure 6:
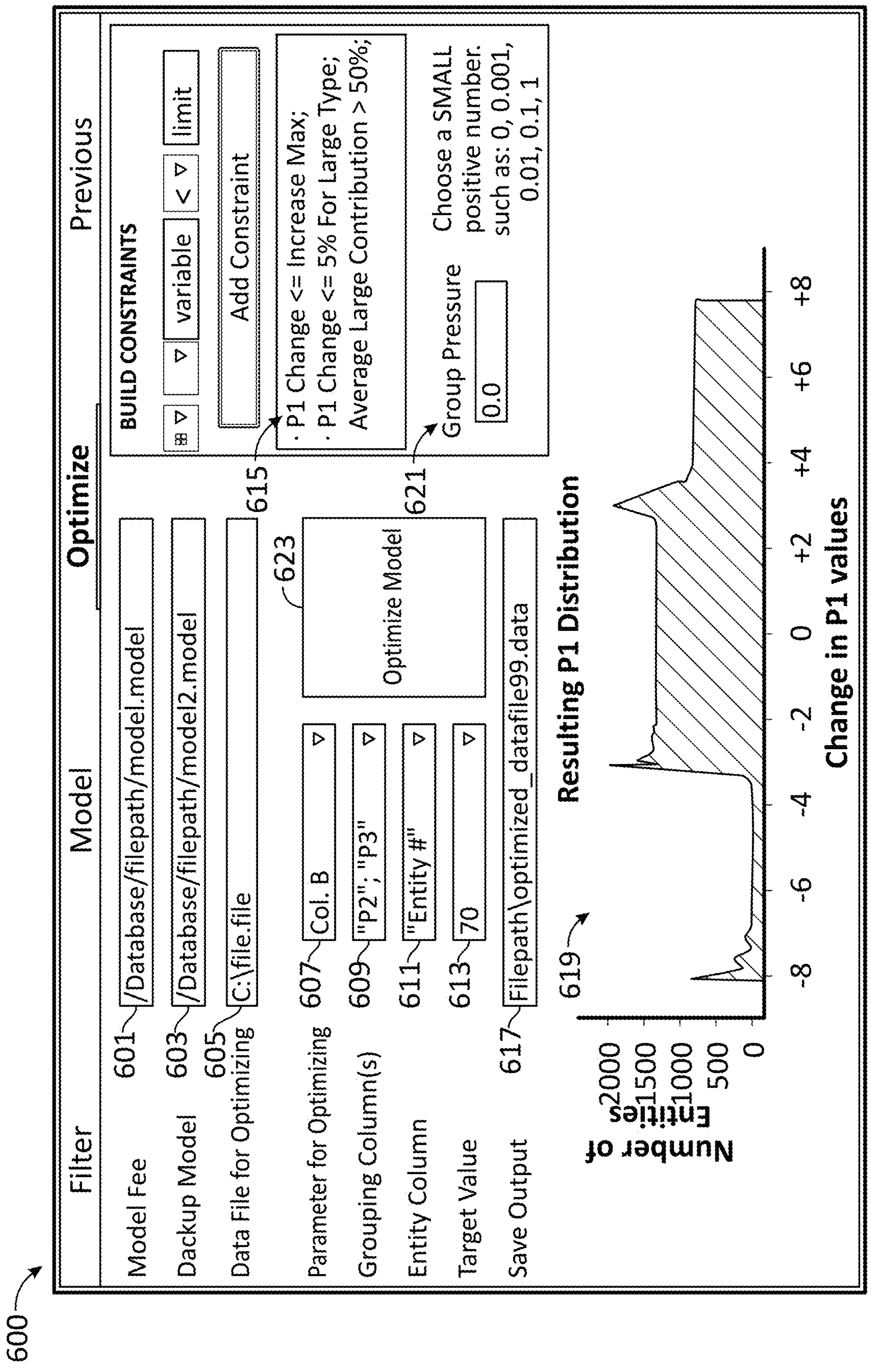
FIG. 6 shows an example UI for generating a model based on historical data.

FIG. 6 shows an example UI 600 for generating a model based on historical data. From either UI 300 or UI 400, a user can cause the UI 600 to be displayed by selecting the “Optimize” tab at in the top row menu. A user can generate one or more models using the UI 300, save the models, and use UI 600 to load the models and optimize data. Using the UI 600, a user can easily select and change models to be used for optimizing data files.

A user can use the user interface to specify a primary model file 601, a backup model file 603, and a data file 605 (such as shown in FIG. 2) for optimizing. The user can specify where the parameter for optimizing 607 (e.g., parameter P1) can be found in the data file. The user can also specify where grouping parameters 609 can be found in the data file. The user can also specify where the entities 611 can be found in the data file. The user can also specify a target value 613 for optimization. The user can also specify one or more optimization constraints 615. The user can also specify a file path 617 for saving the optimized data file. UI 600 also shows a visualization 619 of the optimized parameter values. The optimization and visualization can be generated in response to a user activation of a button 623. The user can also specify group pressure 621.

The UI 600 provides an input element for receiving a primary model file 601 specified by the user. The user may specify the primary model file 601 such as by typing an address or file path, by browsing through folders and selecting a file, by selecting a file in a menu, etc. The primary model file 601 can be used to determine new contributions when values of the parameters P1 are changed during optimization. The primary model file can be a model file generated by the user using UI 300.

Formats of different data files may differ, and the positions of the entities 611, parameter to be optimized 607, and other parameters can be located in different positions in different data files. Input elements 607, 609, and 611 allow the user to specify where in the data file 605 the entities, parameter to be optimized, and other parameters can be found. The locations can be identified, for example, by column, by row, by text from a heading of a column or row, etc.

In some embodiments, the UI 600 can provide a prompt for the user to specify portions of a data file that include different grouping parameters. For example, if a model file includes groupings by parameter P2 and by parameter P3, then the UI 600 can dynamically prompt the user to identify the locations of parameter P2 values and parameter P3 values in the data file 605. If a different model is selected, such as a model that groups by parameter P4, then the UI 600 can change to prompt the user to identify where the data file 605 includes the values for parameter P4.

The model 601 can be a model generated by a user via UI 300. The model 601 include entity groupings, such as listed 317 in FIG. 3, according to values of different parameters. However, the data file 605 may have some entities that do not match one of the groupings in the model 601. Where an entity in the data file does not match a grouping in the model 601, a backup model 603 can be used for that entity. The backup model 603 can include different or broader groupings than included in the model 601. In some embodiments, a default model from in a database or data store can be used if no backup model 603 is specified by the user.

The UI 600 can provide an input element 613 for the user to indicate a desired target value. The optimization algorithm can be run to try to change the parameter for optimizing 607 such that result achieves the target value. A file including the optimized changes can be saved at a file path specified by the user using input element 617.

The user can set constraints on optimization. For example, a user can set maximum changes for the parameter being optimizes (such as a maximum percent change or a maximum value change), specify which groups of entities the maximum changes apply to, and aggregate limits such as an average contribution. The user can also set limits (e.g., maximum or minimum values or changes) for the contribution for certain groups of entities. For example, a constraint could be that the contribution rate of any entity in a particular group should not drop. The constraints can be generated based at least in part on a menu that provides a list of constraints that can be set.

Group pressure 621 can be used to set an indicator of how much parameter P1 values and/or contributions for one group of entity can be changed relative to another group of entities. For example, the group pressure 621 can be a global constraint or parameter used to provide an indication of how different P1 values are from each other from row to row. In some embodiments, group pressure 621 can be provided using the constraint input element 615.

When the user clicks the optimize button 623, the system can load the model file 601, the backup model file 603, and the data file 605 for optimizing. Data for the model file 601, the back model file 603, and the data file 605 for optimizing can be loaded from another computer system over a network into a cache memory. If any of the model file 601, the backup model file 603, or the data file 605 for optimizing were previously loaded into the cache, then cached data can be used instead of loading from the other computer system over the network. Then, the system can iteratively change values for parameters in the data file. During each round of iterative changes, the system can also determine a change in the contribution rate for each entity based on the model type, modeled coefficients, and the modeled entity types in the model file 601. If an entity does not match the modeled entity types, the modeled type and modeled coefficients from the backup model can be used instead. The result can be determined and compared to the target value 613. If the target value 613 is achieved, then the optimization can be completed. Otherwise, the optimization can continue for additional iterations. By the end of the optimization, if the target result is achieved, then the new parameter P1 values can be saved in the output file 617, along with the entities, groupings, other parameters, etc. The output file 617 can be cached and quickly loaded again if further optimization is performed using the output file 617.

After the optimization is completed or is unable to complete after a certain number of iterations, a visualization 619 can show a distribution of the optimized P1 values (or changes from the original P1 values to the optimized P1 values) and the number of entities having each optimized P1 value (or changes from the original P1 values to the optimized P1 values).

Figure 7:
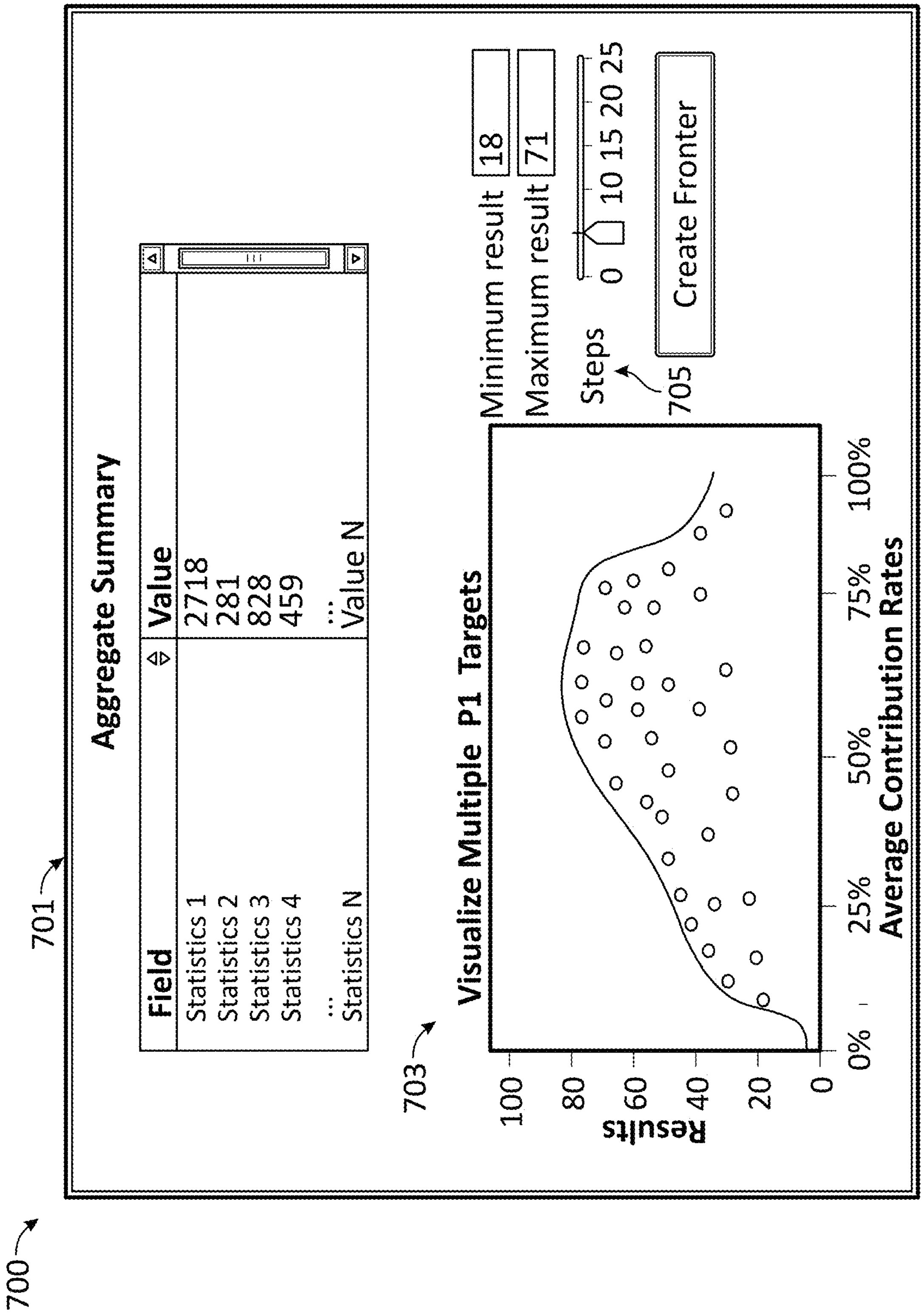
FIG. 7 shows an example UI displaying additional results of optimization.

FIG. 7 shows an example UI 700 displaying additional results of optimization. In some embodiments, elements from the UI 600 of FIG. 6 and from the UI 700 of FIG. 7 can be combined into a single UI. The UI 700 includes a statistic display 701 and a results visualization 703. A steps controller 705 (such as a slider) allows a user to step through steps of an optimization process.

The statistics display 701 can include a plurality of statistics about the optimized values. The statistics can include, for example, an average change to parameter P1 values, maximum and minimum changes to parameter P1 values, the target value, the optimized result, average modeled changes in contribution, average maximum and minimum modeled contributions, and other statistics relating to the parameter P1 values, the contributions, the optimized result, and target. Some statistics can show incremental losses (e.g., whenever the total contribution of an entity's parameter P1 value toward the result is reduced), which may sometimes occur for a few entities when a group of entities is changed. The statistics can additionally or alternatively be shown for each group of entities.

A user can adjust a step controller 705 to select different steps in an optimization process. The step controller 705 can be a slider, a number entry, forward and backward arrows, or other similar input element. The step controller 705 can be adjusted to show results from different steps of the optimization, such as different iterations of an optimization. By adjusting the slider, users can see individual optimization steps. In some cases, even though a computer may determine optimized values, the solution may include strange changes. A user can see if any outliers arise in intermediate optimization steps, consider the real-world meaning of those changes, and make appropriate adjustments.

The visualization 703 can show a relationship between contribution rates and a result as steps progress in the optimization process. For example, the visualization can show a frontier plot of results achieved when certain contribution rates are achieved. The y-axis indicates a total result of an attempted optimization step, and the x-axis indicates an average contribution rate of all entities for the attempted optimization step. Above the step controller 705, maximum and minimum results achieved during the optimization process can be displayed. A user can see how the positions of the points in the frontier plot change during each optimization step. The user can use the information to determine whether an optimization step is moving along the frontier, changes drastically, and/or if the result is unable to achieve a target value. By observing steps that significantly decrease the result, the user can see if the optimizer might be making a bad optimization decision. Also, the user can see tradeoffs between average contribution rates and the effect on the result. For example, at above an average contribution rate of 75%, the overall result drops sharply. A curve shown on the frontier plot indicates a frontier boundary.

In some embodiments, the parameter P1 values associated with entities in different groups can be changed, such as during a step of the optimization process. The parameter P1 values can be changed, for example, based on a model that predicts which parameter P1 values will have a largest contribution to a result. Then, the parameter P1 values for entities in that group can be optimized based on the determination. This can be done quickly on large groups that include thousands, ten thousands, hundreds of thousands, or millions of entities or more.

Using the user interfaces, multiple simulations and optimizations can be performed using rigid, auditable, and provable optimization techniques very quickly instead of slowly performing optimizations based on intuition.

Previous Result User Interface

Figure 8:
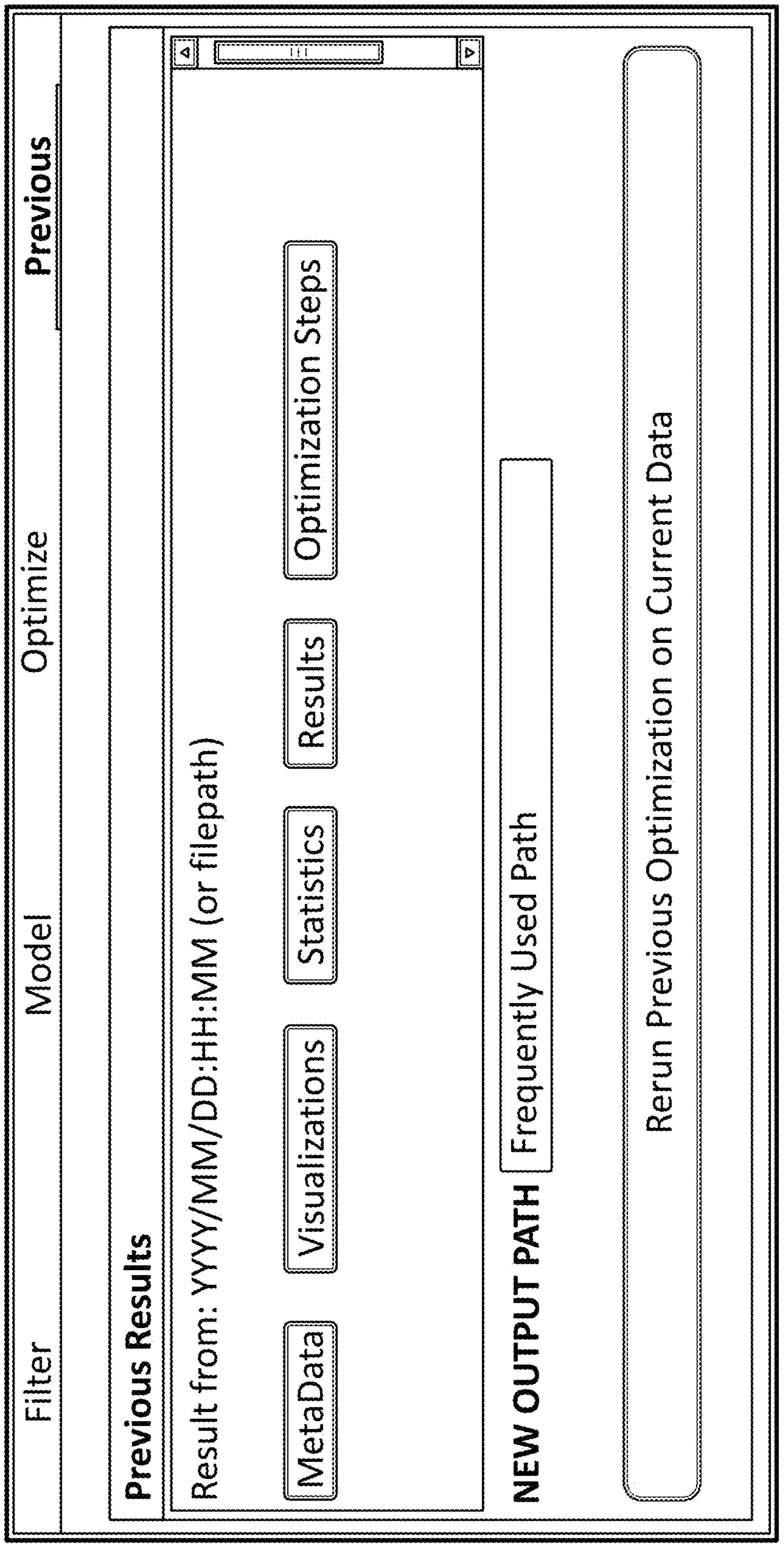
FIG. 8 shows an example UI for showing results from a previous optimization.

FIG. 8 shows an example UI 800 for showing results from a previous optimization. A user can select a previously run optimization and view data about the previously run optimization. The user can select to view metadata, visualizations, statistics, optimized results, and/or optimization steps from the previous optimization. The same optimization can be applied to a currently specified data file for a user to compare optimization results.

Modeling and Optimizing

Figure 9:
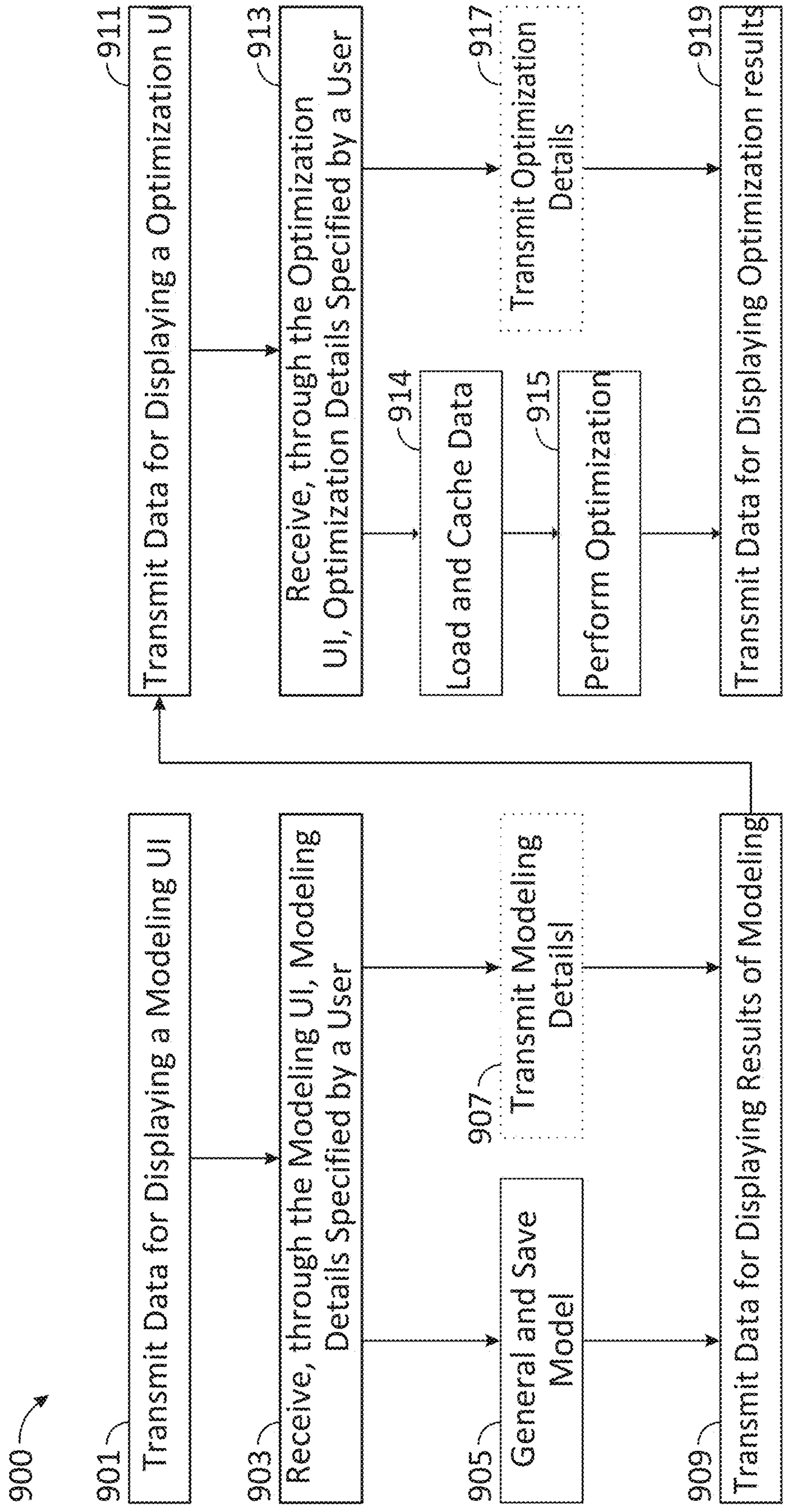
FIG. 9 shows a block diagram of an example process for modeling and optimizing data.

FIG. 9 shows a block diagram of an example process for modeling and optimizing data. Example data is shown in FIG. 2. The data can include a list of entities and a parameter P1 with values for each entity, where the values of parameter P1 are to be optimized to achieve a target result. A result can be determined based at least in part on the values of the parameter P1 and contributions rates for each parameter P1. The data can also include a plurality of other parameters.

At block 901, data for displaying a modeling UI can be transmitted. The modeling UI can include any combination of the user interface elements shown in FIG. 3, FIG. 4, and/or FIG. 5. In some embodiments, the user interface elements can be shown in a plurality of different UI's. The transmitted data can include data for showing one, any combination of, or all of: a prompt for and user input element for a historical data file, a prompt for and user input element for grouping options, a prompt for and user input element for where the parameter to optimize is located in the historical data file, a prompt for and user input element for where the contribution values are located in the historical data file, a prompt for and user input element for a type of model, and a prompt for and user input element for filtering the historical data file.

At block 903, modeling details specified by a user can be received through the modeling UI. For example, the user may specify details including one, any combination of, or all of: the location of a historical data file, grouping options, the location in the historical data file of the parameter to be optimized, the location in the historical data file of the contribution values associated with the parameter to be optimized, a type of model, and a filters for data to include or exclude from historical data file.

At block 905, a model can be generated to determine a relationship between the contribution values and the parameter to be optimized based on the data in the historical data file. The model can be the type of model specified by the user. The model can be generated for each grouping (e.g., each parameter value combination) of entities in the grouping options specified by the user. The data in the historical data file can include data specified for inclusion and/or exclude data specified for excluding according to the filters provided by the user. The generated model can be saved as a file at a location specified by the user.

As an alternative to block 905, at block 907 the modeling details and/or the historical data file can be transmitted through a network to second computer system for the second computer system to perform the modeling. The second computer system can perform the modeling and transmit results back and/or save the generated model at a location specified by the user. In some embodiments, the second computer can be a server, datacenter, etc.

At block 909, data for displaying results of modeling can be transmitted for display. The results can include, for example, data shown in the results area 315 of FIG. 3 and/or visualizations 500 such as described with respect to FIG. 5. The results can include groupings, model coefficients, relationships between the parameter to be optimized and the contribution, and other statistical information.

At block 911, data can be transmitted for displaying an optimization UI. The optimization UI can include any combination of the user interface elements shown in FIG. 6 and/or FIG. 7. In some embodiments, the user interface elements can be shown in a plurality of different UI's. The optimization UI can be displayed, for example, in response to selecting a tab, such as the "Optimize" tab, from the modeling UI of block 903. The optimization UI can be used to select one or more models saved at block 905 for using to perform optimization on a data file. The transmitted data can include data for showing one, any combination of, or all of: a prompt for and a user input element for a model file, a prompt for and a user input element for a backup model file, a prompt for and a user input element for data file for optimizing, a prompt for and a user input element for where the data file includes the parameter to be optimized, a prompt for and a user input element for where the data file includes parameters used for groupings in the model file, a user input element for where the data file includes entities, a prompt for and a user input element for a target value, a prompt for and a user input element for optimization constraints, and/or a prompt for and a user input element for a group pressure.

At block 913, optimization details specified by a user can be received through the optimization UI. For example, the user may specify optimization details including one, any combination of, or all of: a model file, a backup model file, a data file for optimizing, where the data file includes the parameter to be optimized, where the data file includes parameters used for groupings in the model file, where the data file includes entities, a target value, optimization constraints, and/or a group pressure.

At block 914, data specified in the optimization details can be loaded and/or cached. For example, the model file, the backup model file, and the data file for optimizing can be loaded from another computer system over a network and saved into a local cache. If any data is available in the local cache (such as for subsequent optimizations), then the cached data can be used instead of re-loading the data through the network.

At block 915, the optimization can be performed. The various optimization details, including the constraints, can be translated into an optimization problem to be solved. The optimization can include adjusting, for various entities, values of the parameter to be optimized. The optimization can also include using the model to determine a new contribution for the entity based at least in part on a grouping of the entity. If the entity does not match a grouping specified in the model, then the optimization can include determining a new contribution for the entity based at least in part on the backup model. Changes to the values of the parameter to be optimized can remain within constrains specified by the user. When the values of the parameter to be optimized are changed, a new result can be determined and compared to the target value to determine if the optimization was successfully completed. The changes to the values of the parameter to be optimized, the determinations of new contributions for entities, and the determination and comparison of the result can be performed a plurality of times, such as through an iterative process.

As an alternative to block 915, at block 917 the optimization details (and optionally the files specified in the optimization details) can be transmitted through a network to second computer system for the second computer system to perform the optimization. The second computer system can translate the optimization details, including the constraints, into an optimization problem to be solved. The second computer system can perform the optimization and transmit results back and/or save the optimized parameters at a location specified by the user. In some embodiments, the second computer can be a server, datacenter, etc. Transmitted data (such as the model and/or data file) can be cached, such that if a subsequent request is made to run a different optimization using the same model and/or data file, the subsequent request can be processed faster. Accordingly, in some embodiments, the second computer system can perform the loading and caching described with respect to block 914 and transmit optimized results back.

In some embodiments, the optimization details can be translated into a linear system of equations. The optimization can include maximizing a total value of the parameter to be optimized within the constraints, and then iteratively changing the parameter to reduce effects of lower contributions by changing values of the parameter to be optimized.

In some embodiments, the data file to be optimized can be stored on a remote data store, such as in a datacenter or data store that is connected through a network. The data file, or at least relevant portions thereof, can be transmitted through the network to a computer system. The computer system can locally cache the data file, or at least the relevant portions thereof, when performing optimization.

At block 919, data for displaying the optimization results can be transmitted. The optimization results can include for example, statistics such as shown in the statistics display 701 of FIG. 7 and/or visualizations such as the visualization 619 of FIG. 6. In some embodiments, the optimization results can include intermediate results. The intermediate results can be displayed in response to a user selection of an intermediate step, such as shown in visualization 703 of FIG. 7. The statistics and visualizations can show relationships or information about the optimized values, modeled contributions associated with the entities having optimized values, the target value, the results, etc.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, “code,” “instructions,” “module,” “application,” “software application,” and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the “C” programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user’s computer (e.g., the executing computing device), partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 8, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
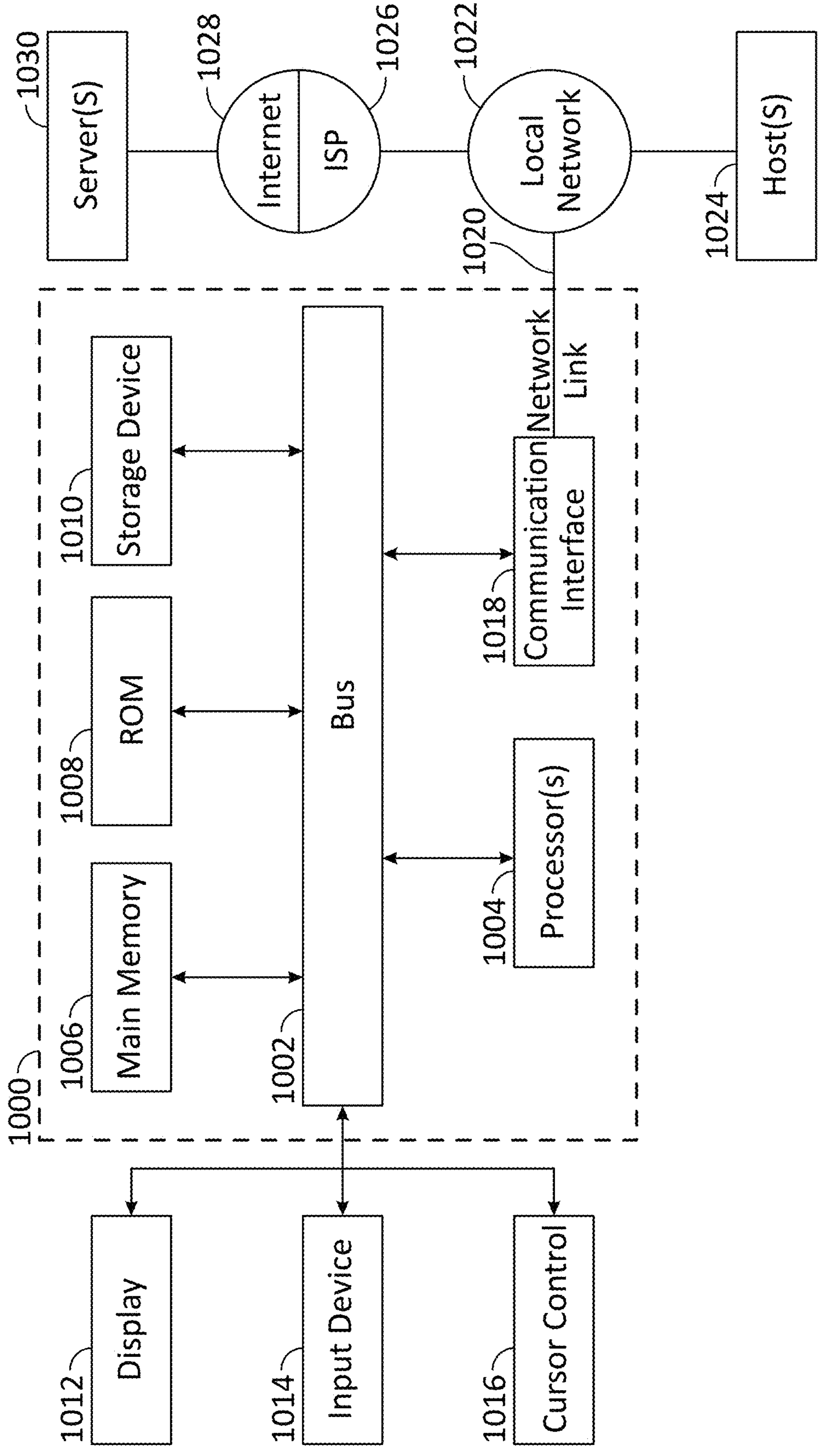
FIG. 10 is a block diagram that illustrates a computer system upon which various embodiments may be implemented.

For example, FIG. 10 is a block diagram that illustrates a computer system 1000 upon which various embodiments may be implemented. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system with an improved user interface, the computer system comprising:

- one or more processors configured to execute computer readable instructions to cause the computer system to:
  - generate display data useable for displaying a user interface comprising:
    - a first input element for receiving one or more optimization constraints;
    - a second input element for receiving an identifier of a contribution model usable for determining, based at least in part on target parameters associated with each of a plurality of entities, a modeled contribution value for each of the plurality of entities;
    - a third input element for receiving identifications of grouping parameters;
    - a fourth input element for specifying a type for the contribution model; and
    - a display area configured to show different group combinations based on the grouping parameters and coefficients determined for the contribution model, wherein the grouping parameters include at least two grouping parameters selected by a user, and wherein the coefficients are determined based at least on the specified type for the contribution model;

optimize, using at least the one or more optimization constraints, the contribution model, and the grouping parameters, the target parameters to achieve an optimization target value; and update the user interface to include a first graphical visualization of a distribution of optimized target parameters associated with each of the plurality of entities, wherein the user interface is configured to dynamically change to prompt the user to identify grouping parameters whenever a new contribution model is identified.

2. The computer system of claim 1, wherein the optimizing comprises:

changing at least some of the target parameters associated the entities, wherein the target parameters are changed to be within the one or more optimization constraints;

determining an entity contribution value for each of the entities using the contribution model; and determining contributions of the target parameters associated with each of the entities toward the optimization target value based at least in part on the entity contribution values for each of the entities.

3. The computer system of claim 1, wherein the one or more processors are configured to execute computer readable instructions to further cause the computer system to:

cache values for the target parameter associated with each of the entities; and optimize the cached values for the target parameters within the one or more optimization constraints to achieve the optimization target value.

4. The computer system of claim 1, wherein the one or more processors are configured to execute computer readable instructions to further cause the computer system to:

translate the optimization constraints into an optimization problem; and cache data associated with the optimization problem to speed up iterations of an optimization algorithm.

5. The computer system of claim 1, wherein the one or more processors are configured to execute computer readable instructions to further cause the computer system to:

generate display data useable for displaying a modeling user interface comprising:

a fifth input element for receiving indication of a historical data file;

an option to generate a model file based on the historical data file; and a sixth input element to specify where to save the model file.

6. The computer system of claim 1, wherein:

the display area is configured to show different groups of entities, and a combination of values of the grouping parameters is shown for each group in the display area.

7. The computer system of claim 6, wherein the modeling user interface further comprises:

a visualization showing, for different groups of entities, a modeled relationship between the modeled contribution value and a change in the target parameter.

8. The computer system of claim 1, wherein the user interface further comprises:

a fifth input element for receiving an identifier of a backup model configured to be used when an entity does not satisfy grouping criteria identified in the contribution model.

9. The computer system of claim 1, wherein the user interface further comprises:

a fifth input element for receiving a selection of an optimization step; and a visualization showing a result achieved during the optimization step.

10. The computer system of claim 9, wherein the user interface further comprises:

a third display area showing statistics about optimized values for the target parameter associated with each of the entities.

11. The computer system of claim 1, wherein the user interface further comprises:

a visualization showing a distribution of optimized values for the target parameter associated with each of the entities.

12. The computer system of claim 11, wherein the visualization is a frontier plot.

13. The computer system of claim 1, wherein the user interface further comprises:

a fifth input element for a file path for saving optimized values for the target parameter.

14. The computer system of claim 1, wherein the user interface further comprises:

a fifth input element for receiving an identification of a data file comprising:

identifiers of the plurality of entities; and the target parameters associated with each of the entities; and a sixth input element for receiving the optimization target value.

15. A computer-implemented method comprising:

by one or more processors configured to execute computer readable instructions:

generating display data useable for displaying a user interface comprising:

a first input element for receiving one or more optimization constraints;

a second input element for receiving an identifier of a contribution model useable for determining, based at least in part on target parameters associated with each of a plurality of entities, a modeled contribution value for each of the plurality of entities;

a third input element for receiving identifications of grouping parameters;

a fourth input element for specifying a type for the contribution model; and a display area configured to show different group combinations based on the grouping parameters and coefficients determined for the contribution model, wherein the grouping parameters include at least two grouping parameters selected by a user, and wherein the coefficients are determined based at least on the specified type for the contribution model;

optimizing, using at least the one or more optimization constraints, the contribution model, and the grouping parameters, the target parameters to achieve an optimization target value; and updating the user interface to include a first graphical visualization of a distribution of optimized target parameters associated with each of the plurality of entities, wherein the user interface is configured to dynamically change to prompt the user to identify grouping parameters whenever a new contribution model is identified.

16. The computer-implemented method of claim 15, wherein the optimizing comprises:

changing at least some of the target parameters associated the entities, wherein the target parameters are changed to be within the one or more optimization constraints;

determining an entity contribution value for each of the entities using the contribution model; and determining contributions of the target parameters associated with each of the entities toward the optimization target value based at least in part on the entity contribution values for each of the entities.

17. The computer-implemented method of claim 15 further comprising:

by the one or more processors configured to execute computer readable instructions:

caching values for the target parameter associated with each of the entities; and optimizing the cached values for the target parameters within the one or more optimization constraints to achieve the optimization target value.

18. The computer-implemented method of claim 15 further comprising:

by the one or more processors configured to execute computer readable instructions:

translating the optimization constraints into an optimization problem; and caching data associated with the optimization problem to speed up iterations of an optimization algorithm.

19. The computer-implemented method of claim 15 further comprising:

by the one or more processors configured to execute computer readable instructions:

generating display data useable for displaying a modeling user interface comprising:

a fifth input element for receiving indication of a historical data file;

an option to generate a model file based on the historical data file; and a sixth input element to specify where to save the model file.

* * * * *